United States Patent Office 3,835,070
Patented Sept. 10, 1974

3,835,070
HARD SURFACE CLEANERS
Charles A. Beck, Painesville, Ohio, assignor to Diamond Shamrock Corporation, Cleveland, Ohio
No Drawing. Filed Apr. 17, 1972, Ser. No. 244,926
Int. Cl. C11d 3/065
U.S. Cl. 252—526                   7 Claims

ABSTRACT OF THE DISCLOSURE

A predominantly aqueous hard surface cleaner particularly useful in household applications contains methylene chloride, a monoalkyl ether of ethylene glycol, a lower alkanol, an alkaline inorganic builder and a sulfated or sulfonated anionic surfactant.

BACKGROUND OF THE INVENTION

A number of cleaning formulations are known which are particularly useful in their concentrated form as spot cleaners to remove difficult soils, especially wax and greased-based soils, from hard surfaces such as those obtaining in the average household. These cleaners generally contain on the order of 80 percent water and depend for their effectiveness on a combination of the cleansing ability of inorganic alkaline detergent builders, the solvency power of certain organic liquids incorporated in minor amounts for this purpose and, to a certain extent, the detergency of the (generally) anionic surfactants included.

While useful, these cleaners are often not completely effective for the intended purpose, particularly where the soils to be removed are primarily wax or grease-containing. Therefore it would be desirable to obtain a predominantly aqueous cleaner of the foregoing type having an improved ability to remove stubborn organic soils.

STATEMENT OF THE INVENTION

Therefore it is an object of the present invention to provide a predominantly aqueous cleaner, stable on storage for extended periods of time and incorporating solvents effective for the removal of organic-based soils.

This and further objects of the present invention will become apparent to those skilled in the art from the specification and claims which follow.

A predominantly aqueous hard surface cleaner has now been found which consists essentially of:

(a) from 0.5 to 10 percent by weight methylene chloride;
(b) from 0.5 to 5 percent of a $C_1$–$C_4$ monoalkyl ether of ethylene glycol;
(c) from 0.5 to 5 percent of a $C_1$–$C_4$ alcohol;
(d) from 0.5 to 5 percent of a water-soluble, alkaline, inorganic builder,
(e) from 0.5 to 10 percent of an anionic surfactant selected from the group consisting of the free acid form or alkali metal, ammonium and amine salts of a compound having a formula selected from the group consisting of

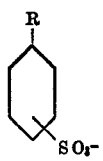   and   $R—(OC_2H_4)_n—O—SO_3^-$ wherein R is a $C_{10}$–$C_{14}$ alkyl and $n$ is an integer from 3–18 and,
(f) the balance water.

Such a cleaner may be compared to the commercially available cleaners for this purpose, which differ in not containing the alcohol and methylene chloride. Inclusion of the methylene chloride has the two-fold advantage of availability of the greater solvency of the chlorinated hydrocarbon, as compared to the glycol ethers alone, while at the same time allowing a reduction in the amount of said glycol ethers in the formulation, methylene chloride and alcohol being less expensive. Further, the product obtained remains clear and stable for extended periods of time.

DESCRIPTION OF THE PREFERRED EMBODIMENTS

In addition to from 0.5 to 10 percent of the methylene chloride, the aqueous cleaner contains from 0.5 to 5 percent of a lower alkanol which serves as a coupling agent for the methylene chloride and water and also contributes to the solvency of the product. These alcohols are those having from 1–4 carbon atoms, such as methyl, ethyl and isopropyl alcohols, and are employed in an amount within the stated range, the larger amounts being used with larger concentrations of methylene chloride.

The glycol ethers, present in the amount of from 0.5 to 5 percent, are the monoalkyl ethers of ethylene glycol, the alkyl radicals containing from 1–4 carbon atoms, for example methyl, ethyl or butyl.

The composition also incorporates from 0.5 to 5 percent by weight of an inorganic, water-soluble, alkaline detergent builder. Such materials are known to the art and include sodium, potassium or ammonium carbonates, bicarbonates or sesquicarbonates; alkali metal silicates, especially sodium metasilicate; alkali metal phosphates and polyphosphates such as trisodium phosphate, disodium orthophosphate, sodium tripolyphosphate, tetrasodium pyrophosphate, tetrapotassium phosphate, potassium tripolyphosphate and sodium hexametaphosphate, and alkali metal borates such as borax and potassium pentaborate. These compounds may be used alone or in combination to achieve the desired effect.

Acting both as an emulsifier and solubilizer, as well as having its own inherent detergent properties, is from 0.5 to 10 percent by weight of an anionic surfactant selected from the group consisting of the free acid form or alkali metal, ammonium and amine salts of a compound having a formula selected from the group consisting of

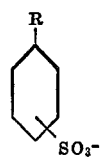   and   $R—(OC_2H_4)_n—O—SO_3^-$ wherein R is a $C_{10}$–$C_{14}$ alkyl and $n$ is an integer from 3–18. Such surfactants appear to act somewhat specifically with the methylene chloride to obtain a clear, stable, water-based formulation. Obviously it is not essential that the alkyl carbon chain be entirely of one length or that all of the alkyl chains be within the recited range, only that the predominant portion be as specified. Exemplary of each class of surfactant are sodium dodecylbenzene sulfonate and the ammonium salt of the sulfated condensation product of ethylene oxide and dodecanol.

While the identity of the various components is apparently more important to obtaining a stable composition than is the exact method of preparation, the following method has proved satisfactory and will serve as a specific example. Into a container at room temperature are placed with stirring and in the stated order, 15 grams methylene chloride, 20 grams ethanol, 10 grams sodium dodecylbenzene sulfonate and 30 grams ethylene glycol butyl ether. To this is added, with continued stirring, 900 grams of water and, finally 10 grams of sodium metasilicate and 15 grams of tetrasodium pyrophosphate. The resulting cleaner is a clear liquid apparently stable for indefinite periods of time.

There is also prepared a more conventional cleaner containing 10 grams of the surfactant, 50 grams of the glycol ether, 910 grams of water, 15 grams of metasilicate and 15 grams of pyrophosphate.

Each of the foregoing are evaluated for their efficacy as cleaning compositions following G.S.A. specification P–C–431a, wherein a synthetic dirt is baked onto a vinyl tile, which tile is then subjected to the action of a scrubbing machine employing the cleaner. According to this test, and with an original panel reflectance reading of 80, the reflectance of the panel cleaned with the product of the present invention is 68.4 whereas the more conventional cleaner yields a reading of only 55.4.

A repeat of the test employing this time as the surfactant the ammonium salt of a sulfonated mixed $C_{10}$–$C_{14}$ alcohol-ethylene oxide condensation product, yields similar comparative results.

Although the invention has been described by reference to certain specific and preferred embodiments thereof it is not to be so limited since changes and alterations may be made therein which are well within the intended scope of the appended claims.

What is claimed is:

1. An aqueous, oil in water emulsion hard-surface cleaner which consists essentially of:
 (a) from 0.5 to 10 percent by weight methylene chloride;
 (b) from 0.5 to 5 percent of a $C_1$–$C_4$ monoalkyl ether of ethylene glycol,
 (c) from 0.5 to 5 percent of a $C_1$–$C_4$ alcohol;
 (d) from 0.5 to 5 percent of a water-soluble, alkaline, inorganic builder;
 (e) from 0.5 to 10 percent of an anionic surfactant selected from the group consisting of the free acid form or alkali metal, ammonium and amine salts of a compound having a formula selected from the group consisting of

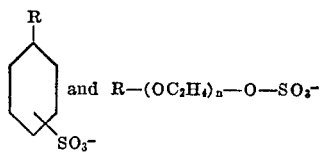

and $R-(OC_2H_4)_n-O-SO_3^-$ wherein R is a $C_{10}$–$C_{14}$ alkyl and $n$ is an integer from 3–18 and,
 (f) the balance water.

2. The cleaner of Claim 1 wherein the surfactant is the free acid form or alkali metal, ammonium and amine salt of a compound having the formula of 3. The cleaner of Claim 1 wherein the surfactant is the free acid form or alkali metal, ammonium and amine salt of a compound having the formula of $$R-(OC_2H_4)_n-O-SO_3^-$$

4. The cleaner of Claim 1 wherein the alcohol is methanol.

5. The cleaner of Claim 1 wherein the alcohol is ethanol.

6. The cleaner of Claim 2 wherein the alcohol is ethanol, the ether is ethylene glycol butyl ether and the builder is sodium metasilicate and tetrasodium pyrophosphate.

7. The cleaner of Claim 3 wherein the alcohol is ethanol, the ether is ethylene glycol butyl ether and the builder is sodium metasilicate and tetrasodium pyrophosphate.

References Cited
UNITED STATES PATENTS

| | | | |
|---|---|---|---|
| 3,701,627 | 10/1972 | Grunewalder | 252—171 |
| 3,538,006 | 11/1970 | Benson et al. | 252—139 |
| 3,391,084 | 7/1968 | York | 252—139 |
| 2,629,697 | 2/1953 | Langdon et al. | 252—559 |

LEON D. ROSDOL, Primary Examiner

E. L. ROLLINS, Assistant Examiner

U.S. Cl. X.R.

134—40; 252—Dig. 14, 8, 139, 153, 172, 537, 539, 545